United States Patent Office 2,978,150
Patented Apr. 4, 1961

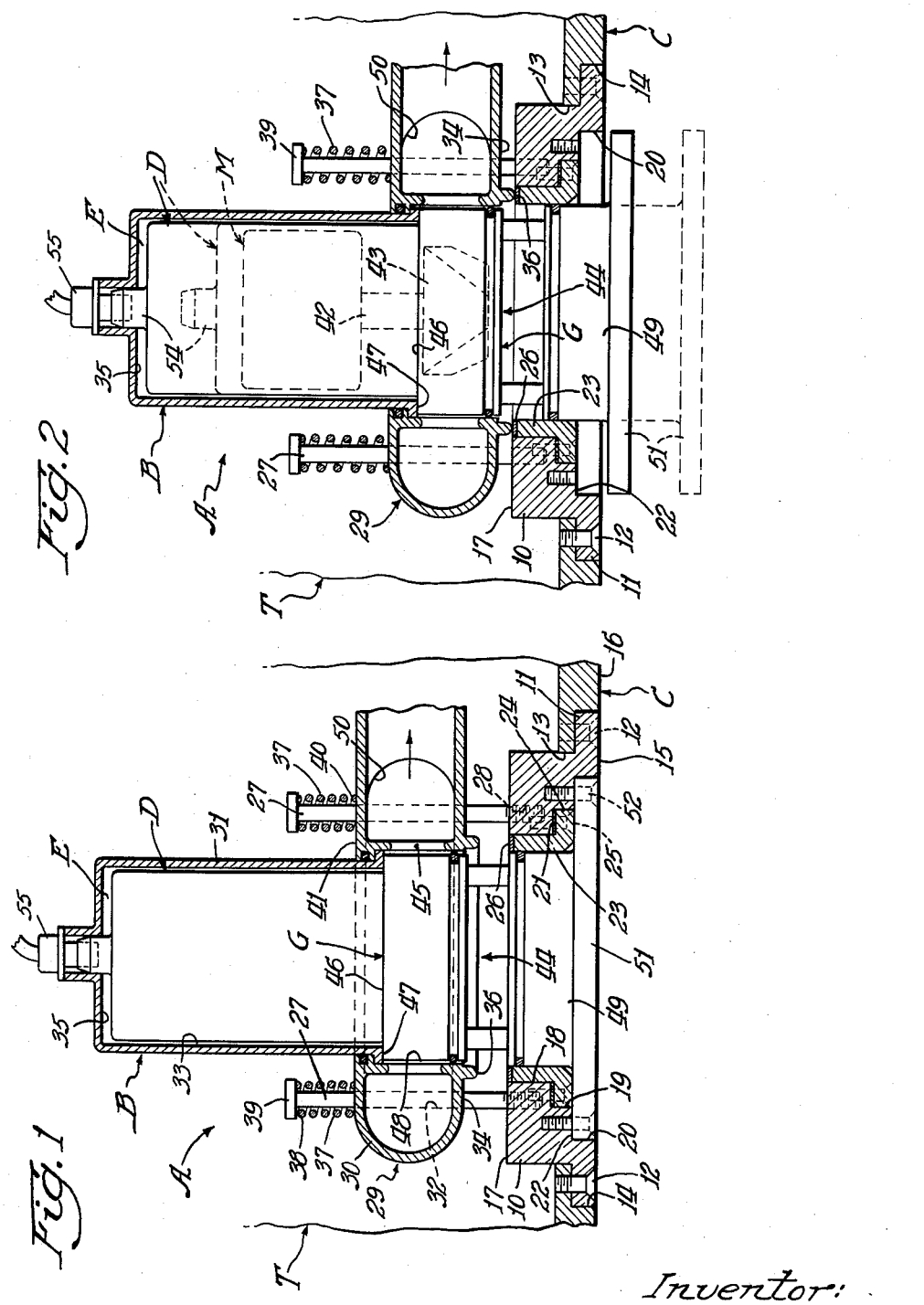

2,978,150

PLUG-IN PUMP ASSEMBLY

Harold S. Doelcher, Sepulveda, Calif., assignor to Borg-Warner Corporation, Chicago, Ill., a corporation of Illinois Filed Oct. 24, 1958, Ser. No. 769,393

1 Claim. (Cl. 222—333)

This invention relates to a plug-in pump assembly, and in particular, to a means for mounting a pump and motor unit within a housing attached to a wall of a fuel storage tank, whereby the pump and motor unit is adapted to be disposed within the fuel storage tank, the housing permitting fluid communication between the interior of the fuel tank and the pump inlet means when the pump and motor unit is disposed therein and preventing fluid communication between the interior of the fuel tank and the exterior of the fuel tank when the pump and motor unit is removed therefrom.

It has been found desirable in modern aircraft to mount a fuel booster pump assembly within a fuel storage tank, and in particular, to mount the fuel booster pump assembly within the fuel storage tank adjacent a bottom wall thereof. However, when the fuel booster pump assembly has been so mounted, it has been found necessary to provide some means whereby the pump and motor unit thereof can be readily removed from the storage tank for replacement thereof or for other maintenance purposes. Heretofore, access means have been provided in the top wall of the storage tank to provide means for inserting and removing the pump and motor unit. Such access means requires, however, that the fuel in the fuel tank must be drained prior to the insertion or the removal of the pump and motor unit in order to permit the mechanic to locate the detachable mounting means to respectively secure or release the pump and motor unit to or from the interior of the fuel storage tank. Other designs provide for inserting the pump and motor unit through an access means formed in the bottom wall of the fuel tank. These latter designs require that some structure must be provided to either prevent the escape of fuel from the storage tank through the access means during the removal and insertion of the pump and motor unit or to permit draining of the fuel from the storage tank prior to such removal or insertion.

It is, therefore, an object of this invention to provide a pump and motor assembly whereby a plug-in pump and motor unit is adapted to be inserted through an access means formed in a wall of a fuel storage tank and be removed therefrom without fluid leakage between the interior of the storage tank and the exterior thereof.

It is another object of this invention to provide a pump and motor assembly whereby a plug-in pump and motor unit having a pump inlet means is adapted to be inserted through an access means formed in a wall of a fuel storage tank and be received within a housing secured therein to the wall, the housing having means permitting fluid communication between the interior of the fuel storage tank and the pump inlet means when the pump and motor unit is inserted therein and preventing fluid communication between the interior of the fuel tank and the exterior of the fuel tank when the pump and motor unit is removed therefrom.

It is a further object of this invention to provide an improved pump and motor assembly in which a plug-in pump and motor unit having a pump inlet means is adapted to be inserted through an access means formed in a wall of a fuel storage tank, the pump and motor unit being received in a housing mounted within the fuel storage tank and secured to the wall thereof, the housing having a portion thereof normally biased to a first position preventing fluid communication between the interior and the exterior of the fuel tank and being moved to a second position when the pump and motor unit is inserted therein whereby fluid communication is permitted between the interior of the fuel tank and the pump inlet means.

Other and more particular objects, advantages, and uses of this invention will become apparent from a reading of the following specification taken in connection with the accompanying drawing forming a part thereof and wherein:

Figure 1 illustrates, in a cross-sectional view, a pump and motor assembly formed in accordance with the teachings of this invention and comprising a pump and motor unit disposed within a housing attached to a bottom wall of a fuel storage tank;

Figure 2 illustrates, in a cross-sectional view, the assembly of Figure 1 where the pump and motor unit is partially withdrawn from the housing.

Reference is now made to the drawing wherein like reference numerals and letters are used throughout the two figures thereof to designate like parts, and particular reference is made to Figure 1 wherein a pump and motor assembly, indicated generally by the reference letter A, comprises a housing B secured to a bottom wall C of a fuel storage tank T, the housing B receiving a pump and motor unit D therein. It is to be understood, of course, that the housing B could be secured to any wall of the fuel storage tank or other device if desired.

The housing B includes a substantially cylindrical base member or housing portion 10 having a circular flange 11 extending radially outwardly therefrom and being adapted to be secured to the storage tank wall C by a plurality of bolts 12. The housing portion 10 is inserted through an aperture 13 formed in the bottom wall C, the bottom wall C being counterbored at 14 whereby the circular flange 11 of the housing portion 10 is received therein and a bottom flat surface 15 thereof is mounted flush with the exterior surface 16 of the wall C. The housing portion 10 is so disposed within the aperture 13 of the wall C that a substantially flat top surface 17 thereof is exposed to the interior of the fuel tank T. A plurality of concentric, interconnected bores 18, 19 and 20 are formed centrally in the housing portion 10, the bores each having a diameter larger than the preceding bore and the bores 18 and 20 respectively interrupting the flat surfaces 15 and 17. An annular shoulder 21 is formed by the juncture of the bores 18 and 19, and another annular shoulder 22 is formed by the juncture of the bores 19 and 20. A sleeve member 23 is inserted within the bore 18 of the housing portion 10 and is formed with a circular, outwardly projecting flange portion 24 adapted to be received in the bore 19. The flange portion 24 abuts and is secured to the shoulder 21 by a plurality of screws or fastening means 25. The sleeve member 23 carries a seal means 26 which is disposed flush with the surface 17 of the housing portion 10. It is to be understood, of course, that the sleeve member 23 may be formed integrally with the housing 10 if desired.

A plurality of elongated pins or bolts 27 are carried by the housing portion 10 and are detachably secured within corresponding, threaded bores 28 formed in the housing portion 10 whereby the pins 27 project substantially perpendicularly from the surface 17 thereof.

A second housing portion 29, having a substantially cylindrical portion 30 and a smaller cylindrical portion 31 formed integrally therewith or suitably fastened thereto, is carried by the first housing portion 10 in the following manner. The pins 27, extending from the housing portion 10, pass through corresponding bores 32 formed in the larger cylindrical portion 30 whereby the second housing portion 29 is adapted to be axially movable relative to the first housing portion 10. The second housing portion 29 is formed with a bore 33 interrupting a substantially flat end surface 34 thereof and terminating within the smaller portion 31 thereof to form an end wall 35. The end surface 34 is provided with an annular, outwardly projecting flange 36 adapted to cooperate with the seal means 26 in a manner later to be described.

A helically coiled spring 37 is disposed about each pin 27 and has one end 38 thereof abutting against a head 39 formed on the end of the respective pin 27 and the other end 40 thereof abutting against a top surface 41 of the housing portion 29. The springs 37, being under compression, tend to force the housing portion 29 downwardly toward the housing portion 10 whereby the annular flange portion 36 thereof would be maintained in sealing engagement with the seal means 26 and thereby prevent fluid communication between the interior of the fuel tank T and a cavity E formed by the bores 33, 18, 19, and 20 in the housing B.

The pump and motor unit D comprises a motor M carrying and driving a shaft 42 attached to a pump impeller 43 of a pump G. The pump and motor unit D is formed with a pump inlet means 44 and a pump outlet means 45. A shoulder portion 46 is formed on the pump and motor unit D and is adapted to cooperate with and abut against a shoulder 47 of the housing portion 29, the shoulder 47 being defined by the juncture of the bore 33 with a conical counterbore 48 formed in the housing portion 29.

The operation of this invention will now be described. Prior to the initial insertion of the pump and motor unit D within the cavity E, the housing portion 29 is maintained in sealing engagement with the seal means 26 of the housing portion 10 by the springs 37 whereby fluid communication is prevented between the interior of the fuel storage tank T and the exterior thereof. When the pump and motor unit D is partially inserted within the cavity E, the shoulder 46 thereof abuts the shoulder 47 of the housing portion 29. When the shoulders 46 and 47 make initial contact, a cylindrical section 49 of the pump G is sealably received in the sleeve member 23 preventing fluid communication therebetween. Upon further insertion of the pump and motor unit D within the cavity E, the shoulder 46 thereof carries the housing portion upwardly in opposition to the force of the springs 37 until the pump and motor unit D is fully inserted in the cavity E. In this manner the housing portion 29 is spaced from the housing portion 10 by the fully inserted pump and motor unit D thereby permitting fluid communication between the interior of the fuel tank 10 and the pump inlet means 44 through the opening created by the spaced surfaces 17 and 34 of the respective housing portions 10 and 29. The impeller 43 is now adapted to receive fluid from the fuel tank T and discharge the same to the pump outlet means 45 and thus into a cooperating scroll discharge means 50 formed in the housing portion 29.

When the pump and motor unit D has been fully inserted within the chamber or cavity E of the housing B, a circular, outwardly flanged end 51 of the pump and motor unit D is received within the counterbore 20 of the housing 10. The flanged end of the pump and motor unit D abuts against the shoulder portion 21 of the housing portion 10 and is secured thereto by a plurality of bolts 52.

When it is desired to remove the pump and motor unit D from the chamber E of the housing B, the bolts 52 are removed and the pump and motor unit is pulled downwardly by suitable grasping means (not shown) attached to the end 51 of the motor and pumping unit D. As the pump and motor unit D is pulled downwardly, the upper housing portion 29 tends to follow the movement thereof as the force of the springs 37 are continually urging the housing portion 29 downwardly toward the housing portion 10. The housing portion 29 moves downwardly until the flange 36 thereof abuts against the seal means 26 of the housing 10 thereby preventing fluid communication between the interior of the fuel tank T and the chamber E. This position of the housing portions 10 and 29 is illustrated in Figure 2. In this manner the pump and motor unit D can be completely removed from the chamber E without any leakage of the fuel from the interior of the storage tank T to the exterior thereof through the cavity E.

It is to be understood that the electrical motor M is provided with suitable plug terminals 54 which are adapted to be received in an electrical coupling means 55 carried by the end wall 35 of the housing portion 29 when the pump and motor unit D is fully inserted within the chamber E of the housing B in order to provide electrical current to operate the motor M.

It can be seen that there has been described a pump and motor unit assembly whereby a cartridge-like pump and motor unit having pump inlet means is adapted to be inserted through an access means formed in a wall of a fuel storage tank, the pump and motor unit being received in a housing attached to the wall of the storage tank and having means to permit fluid communication between the interior of the fuel tank and the pump inlet means when the pump and motor unit is inserted therein and to prevent fluid communication between the interior of the fuel tank and the exterior thereof when the pump and motor unit is removed therefrom.

While this invention has been disclosed in connection with one specific embodiment thereof, it is to be understood that this was by way of example rather than limitation, and it is intended that the invention be defined by the appended claim.

What is claimed is:

In a fuel tank having wall means, a pump and motor assembly comprising: a pump and motor support including a first and a second housing member; means defining a plurality of aligned bores passing through said first housing member; a plurality of pin means carried by said second housing member and projecting therefrom, each of said pin means projecting through each of said bores of said first housing member whereby said first housing member is carried by said second housing member and is movable relative thereto; means securing said support to said wall means; means defining surface means on each of said housing members; means defining a pump and motor unit receiving chamber in said housing members; means carried by said pin means tending to maintain said first housing member in a first position relative to said second housing member whereby said surface means are in sealing engagement with each other thereby preventing fluid communication between the interior of said tank and said chamber; and a pump and motor unit having pump inlet means and received in said chamber, said unit when inserted in said chamber moving said first housing member to a second position relative to said second housing member whereby said surface means are spaced from each other thereby permitting fluid communication between said interior of said tank and said pump inlet means.

References Cited in the file of this patent

UNITED STATES PATENTS 2,420,315    Holt et al.    May 13, 1947
2,865,539    Edwards    Dec. 23, 1958